United States Patent [19]

DeMartino

[11] 4,169,818

[45] Oct. 2, 1979

[54] MIXTURE OF HYDROXYPROPYLCELLULOSE AND POLY(MALEIC ANHYDRIDE/ALKYL VINYL ETHER) AS A HYDROCOLLOID GELLING AGENT

[75] Inventor: Ronald N. DeMartino, Wayne, N.J.

[73] Assignee: Celanese Corporation, New York, N.Y.

[21] Appl. No.: 896,878

[22] Filed: Apr. 17, 1978

[51] Int. Cl.$^2$ .............................................. C08L 1/28
[52] U.S. Cl. .............................. 260/17 R; 252/8.5 R; 252/8.5 LC; 252/8.55 C
[58] Field of Search ................. 260/17 R; 252/8.55 C

[56] References Cited
U.S. PATENT DOCUMENTS

| | | | |
|---|---|---|---|
| 3,793,272 | 2/1974 | Koyanagi et al. ................. | 260/17 R |
| 3,960,736 | 6/1976 | Free et al. ........................ | 252/8.55 R |
| 4,021,355 | 5/1977 | Holtmyer et al. ............... | 252/8.55 R |

*Primary Examiner*—Edward M. Woodberry

[57] ABSTRACT

In one embodiment this invention provides a fluid composition which comprises an aqueous medium which is thickened with a synergistic viscosity mixture of hydroxypropylcellulose and poly(maleic anhydride/alkyl vinyl ether) as a novel hydrocolloid gelling agent.

An aqueous medium thickened with a present invention gelling agent is applicable as a vehicle for explosive slurries, printing pastes, paint formulations, adhesives, and the like. A thixotropic aqueous medium of this invention is uniquely adapted for use as a hydraulic fluid in well-drilling operations and in secondary oil and gas recovery from subterranean formations.

13 Claims, No Drawings

MIXTURE OF HYDROXYPROPYLCELLULOSE AND POLY(MALEIC ANHYDRIDE/ALKYL VINYL ETHER) AS A HYDROCOLLOID GELLING AGENT

BACKGROUND OF THE INVENTION

Well-treating hydraulic fluids commonly employ a viscosity increasing agent such as a water-soluble polymer to improve the flow characteristics and the suspending ability of the fluids. Carboxymethylcellulose, polyacrylamide, polyvinylpyrrolidone, guar, tragacanth, Irish moss, modified starch, and the like, have been employed as water-soluble or water-dispersible additives to provide pumpable gels having solids suspending properties. U.S. Pat. Nos. 3,483,121; 3,757,864; 3,779,914; 3,818,998; 3,900,069; 3,971,440; and references cited therein, describe well-treating hydraulic fluid compositions which contain novel polymeric friction-reducing gelling components.

U.S. Pat. No. 3,836,465 describes a viscoelastic hydraulic fluid composition comprising an aqueous medium containing a mixture of polyalkylene oxide and lignosulfonate salt. The composition is recommended as a fluid loss control agent in drilling fluids and as a diverting agent in subterranean strata.

Other well-treating hydraulic fluid compositions are described in U.S. Pat. Nos. 3,765,918; 3,882,029; 3,953,336; 3,988,246; 4,048,079; and 4,038,206. These particular prior art hydraulic fluids have in common the use of a xanthomonas gum as a gelling agent, particularly in combination with another gelling agent. When xanthomonas gum is blended with another hydrocolloid in an aqueous medium, the resultant solution normally exhibits a viscosity which is consistent with the calculated additive viscosities of the two components.

Hydraulic fracturing fluids which contain a natural resin, such as xanthomonas gum or hydroxyethylcellulose, commonly include a breaker additive to effect a delayed action thinning out of the fluid medium. This facilitates the subsequent removal of the hydraulic fracturing fluid composition from the fractured formation.

Breaker additives include enzymes which under the well-fracturing conditions in a delayed manner autonomously reduce the hydraulic fluid viscosity by degrading the natural gum incorporated as a gelling agent. U.S. Pat. Nos. 2,681,704; 2,801,218; 3,615,794; 3,684,710; and references cited therein, describe new enzyme compositions, such as mannan depolymerase which is derived from a microbiologic source.

The disadvantage of employing natural gum as a gelling agent in hydraulic fracturing fluids is the lessening of fluid loss control caused by plugging of apertures which reduces the permeability of a fractured formation. In the case where a natural resin is employed as a gelling agent in combination with an enzyme breaker additive in a hydraulic fracturing fluid, the hydraulic gel system is often unsatisfactory because the hydrolysis residue of the natural gum is present in sufficient quantity to create a plugging effect and reduces the permeability of a fractured formation.

There remains a need for an efficient and economic hydraulic fluid medium which exhibits improved properties in well-treating applications.

Further, the use of hydrocolloids and mixtures of hydrocolloids is also common in various other formulations developed for specific applications in diverse industries.

U.S. Pat. No. 2,868,741 describes a water base stencil duplicating ink composition which includes a mixture of hydrocolloids such as polyacrylic acid and hydroxyethylcellulose.

U.S. Pat. No. 3,325,425 describes a carboxy-containing acrylic interpolymer latex paint formulation which includes a hydrocolloid thickener mixture such as methylcellulose and sodium salt of polycarboxylated condensed naphthalene.

U.S. Pat. No. 3,485,915 describes aqueous and/or alcoholic compositions suitable for topical application to the skin, wherein the compositions contain a mixture of (1) about 0.1–5 weight percent of a neutralized carboxy polymer and (2) about 0.1–2 weight percent of hydroxypropylcellulose as a thickening agent.

U.S. Pat. No. 3,793,272 describes a synthetic resin composition which consists of an emulsion or latex of a vinyl or acrylic resin such as polyacrylic acid in admixture with a hydroxybutylhydroxyethylcellulose derivative.

U.S. Pat. No. 3,947,392 describes a sand core and mold composition for application in casting metals, wherein the composition consists essentially of foundry sand, clay, water, and between about 0.0025–1.0 weight percent of a water-soluble graft copolymer of acrylic acid and a minor amount of a water-soluble polyhydroxy polymeric compound such as a derivative of cellulose or starch.

As is evident from the prior art exemplified hereinabove, hydrocolloid thickened fluid media find important technical application in a broad variety of manufacturing industries. There is continuing research effort to develop novel high viscosity aqueous systems which exhibit improved properties in diverse applications.

Accordingly, it is a main object of this invention to provide a high viscosity fluid composition comprising an aqueous medium and a synergistic mixture of hydrocolloid components, which aqueous composition exhibits a greater viscosity than the calculated additive viscosity values of the said hydrocolloid components.

It is another object of this invention to provide a partially-synthetic hydrocolloid thickened aqueous medium having improved viscosity and suspending properties for application as a well-treating hydraulic fluid composition.

It is a further object of this invention to provide a well-fracturing hydraulic fluid composition containing a partially synthetic hydrocolloid gelling agent in combination with a breaker additive, which is characterized by a low yield of hydrolysis residue.

Other objects and advantages of the present invention shall become apparent from the accompanying description and examples.

DESCRIPTION OF THE INVENTION

One or more object of the present invention are accomplished by the provision of a fluid composition comprising an aqueous medium which is thickened with a mixture of hydroxypropylcellulose and maleic anhydride/alkyl vinyl ether copolymer which functions as a gelling agent exhibiting synergistic viscosity properties.

In an important aspect the present invention is based on the discovery that unlike most combinations of natural and synthetic hydrocolloid gums and resins employed for thickening aqueous solutions, a mixture of hydroxypropylcellulose and maleic anhydride/alkyl vinyl ether copolymer is capable of inducing an extraordinary viscosity enhancement effect, which usually is at least 100 percent greater than the calculated additive viscosity contributions of the respective hydrocolloid components. It was found that the specific combination of hydroxypropylcellulose with maleic anhydride/alkyl vinyl ether copolymer unexpectedly provides a substantial synergistic effect on the viscosity of an aqueous medium, in contradistinction to various other combinations of similar types of synthetic and natural hydrocolloid mixtures which exhibit less viscosity synergism or no viscosity synergism. In some cases, a combination of hydrocolloids as a gelling agent exhibits an observed viscosity value which is less than the sum of the calculated additive viscosity contributions of the respective hydrocolloid components of the gelling agent.

In the practice of the present invention, a synergistic effect can be observed when a mixture of hydroxypropylcellulose and maleic anhydride/alkyl vinyl ether copolymer is employed as a gelling agent in an aqueous medium in a quantity between about 0.05 and 5 weight percent, based on the weight of water.

The relative ratio between the hydroxypropylcellulose and maleic anhydride/alkyl vinyl ether copolymer components in the gelling agent can vary over a broad range between about 95:5 and 5:95 weight percent of hydroxypropylcellulose to maleic anhydride/alkyl vinyl ether copolymer. In order to achieve an incremental synergistic viscosity increase of at least 50 percent over the calculated additive viscosity value of the combination of gelling agent components as measured in centipoises at 25° C., it is preferred to maintain the relative ratio of the hydroxypropylcellulose to maleic anhydride/alkyl vinyl ether copolymer in the gelling agent in the range between about 70:30 and 30:70 weight percent. An incremental synergistic viscosity increase of at least 100 percent over the calculated additive viscosity value can be obtained when the said gelling agent components are in the range between about 60:40 and 40:60 weight percent.

In the practice of the present invention, the mixture of hydroxypropylcellulose and poly(maleic anhydride/alkyl vinyl ether) can be dry-blended to produce a convenient form of the invention gelling agent. The said gelling agent can then be incorporated into an aqueous medium by the simple expediency of mixing the gelling agent in the medium with stirring. Hydration of the two hydrocolloid components of the gelling agent is usually complete within a period of several hours at room temperature.

In order to achieve solubilization of the poly(maleic anhydride/alkyl vinyl ether) component of the thickener composition in an aqueous medium, it is advantageous to add an alkaline reagent to the aqueous medium to convert the carboxylic acid anhydride groups of the copolymer into the form of neutral salts. Hence, it is desirable that the ultimate pH of the thickened aqueous composition be in the range between about 4 and 13, and preferably in the range between about 6 and 11. The adjustment of pH, and the hydration of the copolymer component, are facilitated by the addition of an appropriate quantity of alkali metal hydroxide such as sodium hydroxide. If the hydroxypropylcellulose hydrocolloid component of the gelling agent contains an alkaline residue as an impurity from the synthesis reaction of cellulose with propylene oxide in the presence of an alkaline catalyst to produce the hydroxypropylcellulose, then it is an economic advantage to permit the said alkaline residue to aid and effect adjustment of pH of the thickened aqueous composition into the desired range.

As an alternative method of formulating a thickened aqueous composition of the present invention, the respective hydroxypropylcellulose and poly(maleic anhydride/alkyl vinyl ether) components first can be dissolved individually to form separate aqueous solutions, and then in a second step the two solutions can be blended together.

HYDROXYPROPYLCELLULOSE COMPONENT

Hydroxypropylcellulose is commercially produced by reacting alkali cellulose with propylene oxide at elevated temperatures and pressures. Methods of producing hydroxyalkylcellulose are described in U.S. Pat. Nos. 2,572,039; 3,131,196; 3,485,915; and references cited therein.

Scientific literature suggests that etherification proceeds by a substitution reaction mechanism that yields hydroxypropyl substituents containing secondary hydroxyl groups almost exclusively. The secondary hydroxyl groups in the hydroxypropyl substituents in turn are available for further reaction with propylene oxide, which results in the formation of side-chains containing more than one mole of combined propylene oxide.

An idealized structural model for hydroxypropylcellulose with a molar substitution (M.S.) of 3 can be represented by the chemical formula:

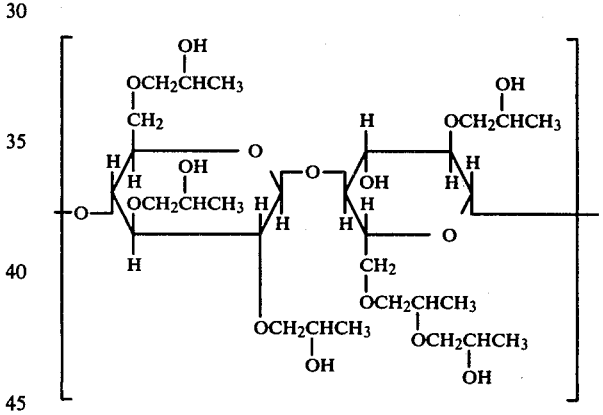

The term "molecular substitution" refers to the average number of moles of hydroxypropyl substituted in the cellulose per anhydroglucose unit. For the purposes of the present invention, the average M.S. in the hydroxypropylcellulose hydrocolloid component normally will vary in the range between about 2 and 5, and preferably in the range between about 2.5 and 4.

The synergistic viscosity enhancement observed in the high viscosity aqueous fluid media of the present invention appears to increase as the molecular weight of each hydrocolloid component increases. Hence, in the practice of the present invention it is preferred that the molecular weight of the hydroxypropylcellulose component is at least 300,000, and most preferably is at least 800,000. Klucel H (Hercules) is a commercial hydroxypropylcellulose product which is characterized as having a nominal molecular weight of about 1,000,000.

POLY(MALEIC ANHYDRIDE/ALKYL VINYL ETHER) COMPONENT

The term "maleic anhydride" as employed herein is meant to include α,β-olefinically unsaturated dicarboxylic acid anhydride comonomers represented by the structural formula:

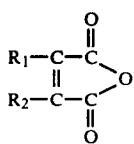

wherein $R_1$ and $R_2$ are independently selected from the group consisting of hydrogen, halogen, cyano, and acyclic and cyclic aliphatic and aromatic substituents such as alkyl, aryl, alkaryl, aralkyl, cycloalkyl, and the like, containing between one and about ten carbon atoms.

Compounds corresponding to the above formula include maleic anhydride, chloromaleic anhydride, 2,3-dichloromaleic anhydride, cyanomaleic anhydride, 2,3-dicyanomaleic anhydride, methylmaleic anhydride, 2,3-dimethylmaleic anhydride, ethylmaleic anhydride, propylmaleic anhydride, butylmaleic anhydride, 2,3-di-n-butylmaleic anhydride, phenylmaleic anhydride, cyclohexylmaleic anhydride, and the like.

The term "alkyl vinyl ether" as employed herein is meant to include comonomers represented by the formula:

wherein R is preferably limited to alkyl groups such as methyl, ethyl, isobutyl, pentyl, octyl, decyl, and the like, which contain between one and about 10 carbon atoms.

The ratio of the comonomers in the maleic anhydride/alkyl vinyl ether copolymer hydrocolloid usually is in a 1:1 ratio, and in some cases the ratio will vary between 5:4 and 4:5. The molecular weight of the copolymer may vary over a wide range between several thousand and several million. In terms of viscosity as disclosed in U.S. Pat. No. 3,781,203, the specific viscosity values can vary between about 0.1 and 10.

Illustrative of a preferred copolymer hydrocolloid is one corresponding to the structural formula:

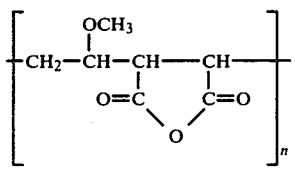

where n is an integer between about 11 and 700. A particularly preferred poly(maleic anhydride/alkyl vinyl ether) hydrocolloid is a high molecular weight maleic anhydride/methyl vinyl ether copolymer having a specific viscosity of at least 2.5 as determined in a solution of one gram of copolymer in one hundred milliliters of methyl ethyl ketone (MEK) at 25° C.

WELL-TREATING HYDRAULIC FLUIDS

In another of its embodiments this invention accomplishes an important objective by the provision of a hydraulic fluid composition of high viscosity which comprises an aqueous solution having incorporated therein (1) a hydrated mixture of hydroxypropylcellulose and poly(maleic anhydride/alkyl vinyl ether) hydrocolloids as a gelling agent, and (2) a breaker additive for subsequent reduction of solution viscosity. For the purpose of well-fracturing applications, the preferred hydraulic fluid compositions contain additionally a propping agent such as sand or comminuted walnut shells.

The quantity of gelling agent incorporated in an invention well-treating hydraulic composition can vary in the range between about 0.05 and 5 weight percent based on the weight of the water component. A preferred range is between about 0.1 and 2 weight percent of gelling agent, based on the weight of water.

The breaker additive in the invention hydraulic fracturing fluids is preferably a compound which under formation fracturing conditions autonomously degrades the hydroxypropylcellulose and poly(maleic anhydride/alkyl vinyl ether) gelling agent components so as to reduce the viscosity of hydraulic fluid which is under hydrostatic pressure. Although the effect of the breaker additive commences immediately upon intimate admixture of the hydroxypropylcellulose/poly(maleic anhydride/alkyl vinyl ether) gelling agent and the breaker additive, the time required to reduce the solution viscosity by 50 percent can range over a period between about one half hour and two hours. The rate of gelling agent degradation is affected by pH, temperature, and salt content of the hydraulic fluid system.

The breaker additive can be employed in a quantity between about 0.01 and 25 weight percent, based on the weight of gelling agent in an invention hydraulic fluid composition.

One type of breaker additive compounds which can be employed are those which provide an acidic pH to an invention well-treating hydraulic fluid composition. Such breaker additives include inorganic and organic acids, and compounds such as esters which convert to acidic derivatives under well-treating conditions. Illustrative of suitable breaker additives of this type are sulfuric acid, hydrochloric acid, p-toluenesulfonic acid, acetic acid, triethyl phosphate, methyl formate, ethyl propionate, butyl lactate, and the like. This type of breaker additive can be employed in a quantity between about 0.5 and 20 weight percent, based on the weight of hydroxypropylcellulose/poly(maleic anhydride/alkyl vinyl ether) gelling agent in a hydraulic fluid composition.

Another type of breaker additive compounds which can be employed are oxidizing agents. Illustrative of suitable breaker additives of this type are ammonium persulfate, potassium dichromate, potassium permanganate, peracetic acid, tertiary-butyl hydroperoxide, and the like. This class of breaker additive can be employed in a quantity between about 0.5 and 20 weight percent, based on the combined weight of hydroxypropylcellulose and poly(maleic anhydride/alkyl vinyl ether) in a hydraulic fluid composition.

The above-described classes of breaker additive compounds are known in the art. The selection and application of breaker additives in well-treating hydraulic fluid compositions is described in U.S. Pat. Nos. 3,922,173; 3,816,151; 3,960,736; 4,021,355; and references cited therein; and in *Hydraulic Fracturing*, by G. C. Howard and C. R. Fast, Monograph Series, Volume 2, Society of Petroleum Engineers, Dallas, Tex. (1970).

It is to be noted that an enzyme type of breaker additive may be employed in combination with one of the breaker additives described above. Hemicellulase enzyme, for example, can hydrolyze hydroxypropylcellulose at a convenient rate, but it is ineffective for degradation of a poly(maleic anhydride/alkyl vinyl ether) type of synthetic hydrocolloid resin.

The present invention well-treating hydraulic fluid compositions consisting essentially of (1) an aqueous medium, (2) hydroxypropylcellulose/poly(maleic anhydride/alkyl vinyl ether) gelling agent, (3) a breaker additive, and (4) a propping agent, are eminently suitable for application as well-fracturing fluid media.

The hydraulic fluid compositions of the present invention exhibit excellent solution stability and heat stability in comparison with the corresponding hydraulic fluid compositions containing as a gelling agent any of the conventional industrial gums or cellulosic derivatives of the types recited in U.S. Pat. No. 3,960,736. The invention hydraulic fluid compositions have superior ability to hydrate and develop high viscosity in the presence of salts. Further, a breaker additive can degrade the hydroxypropylcellulose/poly(maleic anhydride/alkyl vinyl ether) gelling agent at a convenient rate and with a resultant low yield of residue, e.g., a yield of less than about 2 weight percent residue, based on the original weight of gelling agent.

The following examples are further illustrative of the present invention. The reactants and other specific ingredients are presented as being typical, and various modifications can be derived in view of the foregoing disclosure within the scope of the invention.

EXAMPLE I

This Example illustrates a procedure for the production of maleic anhydride/alkyl vinyl ether copolymer in accordance with U.S. Pat. No. 2,782,182.

One part of maleic anhydride and one part of methyl vinyl ether are dissolved in 3.8 parts of benzene. To the resulting solution there is added 0.125 percent lauryl peroxide, based on weight of monomer charge.

The solution is heated at 60° C. for a period of time up to about ten hours until a substantially quantitative yield of maleic anhydride/methyl vinyl ether copolymer is produced.

EXAMPLE II

This Example illustrates a general procedure for the production of hydroxypropylcellulose in accordance with U.S. Pat. Nos. 2,572,039 and 3,131,176.

To a slurry of 1 part of finely divided cotton linters, 1.5 parts water and 10 parts of tertiary-butanol is added 0.8 part 50% sodium hydroxide. The mixture is stirred for about 20 minutes, after which time 1.7 parts propylene oxide in 1.5 parts tertiary-butanol are added and the reaction medium is heated at a temperature of about 50°-60° C. for a period of several hours.

Optionally, the resultant product mixture is neutralized with an organic or inorganic acid, and then the product mixture solids are separated from the liquid reaction medium by filtration. The filter cake is stirred with 80% tertiary-butanol aliquots as a purification procedure. The hydroxypropylcellulose product so produced has a nominal hydroxypropyl M.S. of 2.5.

It is to be noted that for purposes of the present invention it is not necessary to neutralize the alkalinity of the above proposed product mixture, since the presence of a basic reagent such as an alkali metal hydroxide is advantageous for promoting the solubilization of poly(alkyl vinyl ether) component when one of the synergistic viscosity fluid media of the present invention is prepared in a subsequent procedure.

EXAMPLE III

This Example illustrates the large viscosity increase in an aqueous medium provided by a synergistic mixture of hydroxypropylcellulose and maleic anhydride/alkyl vinyl ether copolymer as a gelling agent.

A 3% aqueous solution of maleic anhydride/methyl vinyl ether copolymer (Gantrez AN-179, GAF) and a 1% aqueous solution of hydroxypropylcellulose (Klucel H; Hercules) are prepared. Dissolution of the methyl vinyl ether copolymer is aided by adjusting the pH of the aqueous medium into the range of 6-11 with sodium hydroxide.

The viscosity of each solution is determined in centipoises with a Brookfield Viscometer Model RVF, spindle No. 4 at 20 rpm.

An equal volume of each solution are blended together, and the viscosity of the blend solution is measured.

| Initial Viscosities | |
|---|---|
| Hydroxypropylcellulose (1%) | 1800 |
| Methyl vinyl ether copolymer (3%) | 2200 |
| Blend Viscosity (1:1) | |
| Calculated | 1989 |
| Observed | 5900 |

Under comparable experimental conditions, the following viscosity data are obtained for the indicated hydrocolloid mixtures:

| 1:1 of 1% Solutions | Viscosities | |
|---|---|---|
| | Calc. | Observed |
| HPC[1]/Cyanamer P-250 (3%)[2] | 2932 | 1800 |
| HPC/PEO (2%)[3] | 2720 | 1500 |
| HPC/Kelzan XC[4] | 3367 | 5000 |
| Isobam HH[5]/PEO (2%) | 5562 | 7000 |
| Isobam HH/MC[6] | 5479 | 9000 |
| Isobam HH/HEC[7] | 5137 | 7000 |
| Isobam HH/CMC[8] | 4266 | 4300 |
| Gantrez AN-179 (3%)/ Cyanomer P-250 | 2932 | 3000 |
| Gantrez AN-179 (3%)/CMG[9] | 3382 | 1200 |

[1]Hydroxypropylcellulose; Klucel H; Hercules.
[2]Polyacrylamide; American Cyanamid.
[3]Polyethylene oxide; Polyox Coagulant; Union Carbide.
[4]Xanthan gum; Kelco.
[5]Maleic anhydride/isobutylene copolymer; Kuraray Co. Ltd.; Osaka, Japan.
[6]Methylcellulose; Methocel J 75 MS; Dow.
[7]Hydroxyethylcellulose; Natrosol 250HH; Hercules.
[8]Carboxymethylcellulose; CMC-7H; Hercules.
[9]Carboxymethylguar; D.S. of 0.06; Stein Hall.

The calculated viscosity of a blend is determined by means of the following equation:

$$\text{Log } \eta S = \frac{X \log \eta^1 + (100 - X) \log \eta^2}{100}$$

where
 $\eta S$ = viscosity of blend
 $X$ = weight percent of first component of blend
 $\eta^1$ = viscosity of first component of blend
 $\eta^2$ = viscosity of second component of blend As it is apparent from a comparison of the above reported data, a present invention gelling agent consisting of a mixture of hydroxypropylcellulose and poly(maleic anhydride/alkyl vinyl ether) imparts an unexpectedly large incremental synergistic viscosity increase to an aqueous medium. Similar advantages are achieved when in the copolymer hydrocolloid component of the gelling agent the maleic anhydride comonomer contains a substituent such as methyl or chloro, and the alkyl group in the alkyl vinyl ether comonomer is an ethyl, propyl, butyl, pentyl, hexyl, heptyl, octyl, nonyl or decyl substituent.

What is claimed is:

1. A hydraulic fluid composition which comprises an aqueous solution containing (1) between about 0.05 and 5 weight percent, based on the weight of water, of a mixture of hydroxypropylcellulose (average M.S. between about 2 and 5) and maleic anhydride/alkyl vinyl ether copolymer as a gelling agent, wherein the alkyl group of the alkyl vinyl ether contains between 1 and about 10 carbon atoms, the gelling agent components are in a relative ratio between about 95:5 and 5:95 weight percent, and the specific viscosity of the copolymer component is between about 0.1 and 10; and (2) between about 0.01 and 25 weight percent, based on the weight of gelling agent, of a breaker additive for subsequent reduction of solution viscosity.

2. A hydraulic fracturing fluid composition comprising (1) an aqueous medium; (2) between about 0.05 and 5 weight percent, based on the weight of water, of a synergistic viscosity mixture of hydroxypropylcellulose (average M.S. between about 2 and 5) and maleic anhydride/alkyl vinyl ether copolymer as a gelling agent, wherein the alkyl group of the alkyl vinyl ether contains between 1 and about 10 carbon atoms, the gelling agent components are in a relative ratio between about 95:5 and 5:95 weight percent, and the specific viscosity of the copolymer component is between about 0.1 and 10; (3) between about 0.01 and 25 weight percent, based on the weight of gelling agent, of a breaker additive for subsequent autonomous reduction of the gelling properties of the mixture of hydroxyproplycellulose and maleic anhydride/alkyl vinyl ether copolymer; and (4) a propping agent.

3. A hydraulic fracturing fluid composition in accordance with claim 2 wherein the maleic anhydride/alkyl vinyl ether copolymer component in the gelling agent is maleic anhydride/methyl vinyl ether compolymer.

4. A hydraulic fracturing fluid composition in accordance with claim 2 wherein the breaker additive is an acid or ester compound.

5. A hydraulic fracturing fluid composition in accordance with claim 2 wherein the breaker additive is an oxidizing compound.

6. A hydraulic fracturing fluid composition in accordance with claim 2 wherein the propping agent is sand.

7. A thickened aqueous composition having a pH in the range of between about 6 and 11, and containing between about 0.05 and 5 weight percent, based on the weight of water, of a synergistic hydrocolloid mixture of hydroxypropylcellulose (average M.S. between about 2 and 5) and maleic anhydride/alkyl vinyl ether copolymer as a gelling agent, wherein the alkyl group of the alkyl vinyl ether contains between 1 and about 10 carbon atoms, the gelling agent components are in a relative ratio between about 95:5 and 5:95 weight percent, and the specific viscosity of the copolymer component is between about 0.1 and 10.

8. An aqueous composition in accordance with claim 7 wherein the hydroxypropylcellulose component in the gelling agent has a molecular weight of at least about 800,000.

9. An aqueous composition in accordance with claim 7 wherein the maleic anhydride/alkyl vinyl ether copolymer component in the gelling agent is maleic anhydride/methyl vinyl ether copolymer containing the copolymerized monomers in about an equimolar ratio.

10. An aqueous composition in accordance with claim 7 wherein the maleic anhydride/alkyl vinyl ether copolymer is a high molecular weight maleic anhydride/methyl vinyl ether copolymer having a specific viscosity of at least 2.5 as determined in a solution of one gram of copolymer in one hundred milliliters of MEK at 25° C.

11. A process for increasing the viscosity of an aqueous medium which comprises incorporating therein between about 0.05 and 5 weight percent, based on the weight of water, of a synergistic viscosity mixture of hydroxypropylcellulose (average M.S. between about 2 and 5) and maleic anhydride/alkyl vinyl ether copolymer as a gelling agent; wherein the alkyl group of the alkyl vinyl ether contains between 1 and about 10 carbon atoms, the gelling agent components are in a relative ratio between about 95:5 and 5:95 weight percent, and the specific viscosity of the copolymer component is between about 0.1 and 10.

12. A process in accordance with claim 11 wherein the maleic anhydride/alkyl vinyl ether component of the gelling agent is maleic anhydride/methyl vinyl ether copolymer.

13. A process in accordance with claim 11 wherein the incremental synergistic increase in viscosity is at least 100 percent greater than the calculated additive viscosity contributions of the hydroxypropylcellulose and maleic anhydride/alkyl vinyl ether components of the gelling agent.